March 15, 1966 L. C. FRAZIER 3,240,250
PNEUMATIC TIRES
Filed June 11, 1964 3 Sheets-Sheet 2
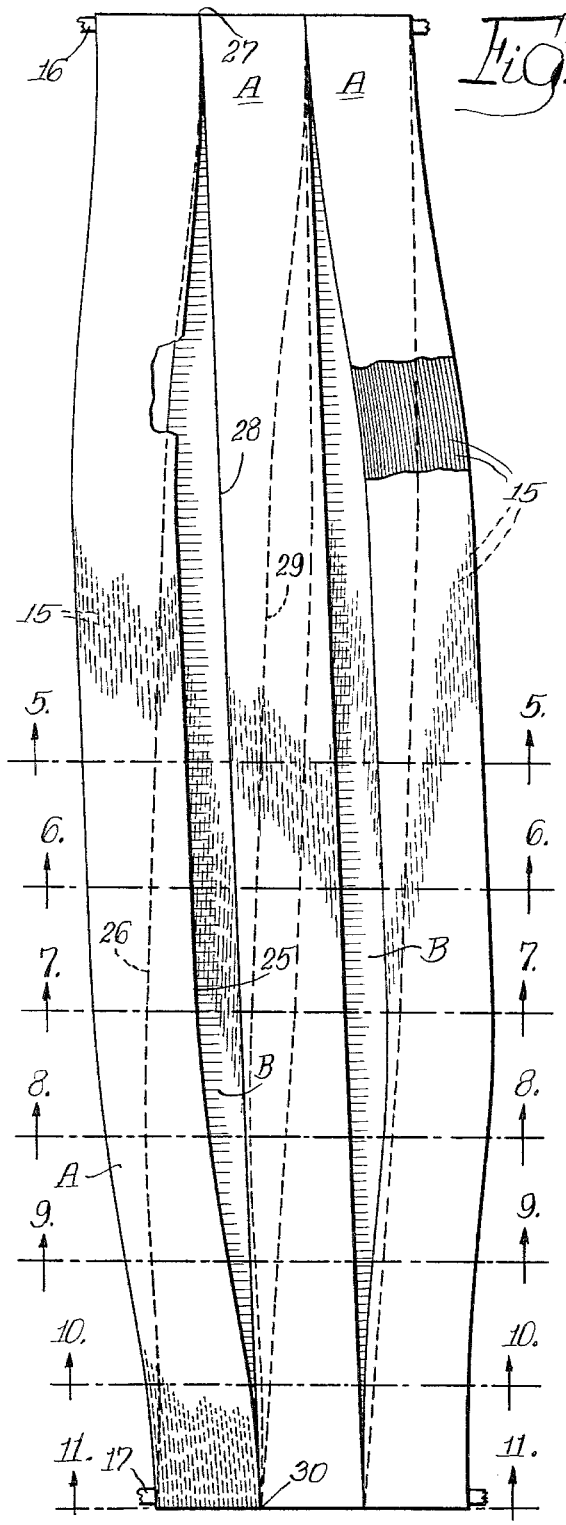
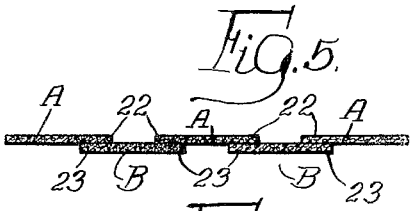
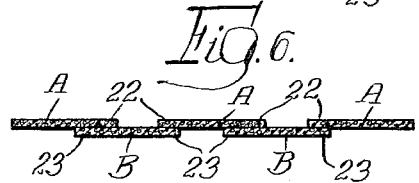
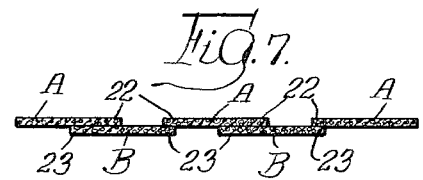
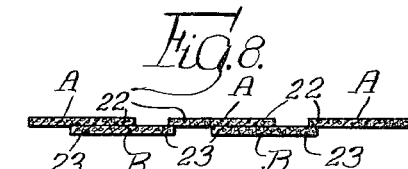
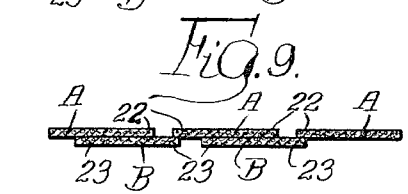
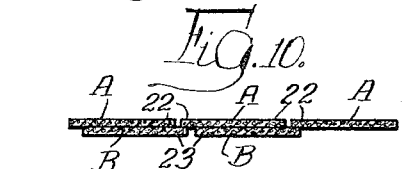
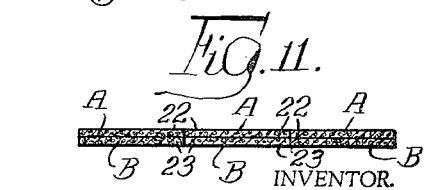
INVENTOR.
Larry C. Frazier,
BY
ATTYS.

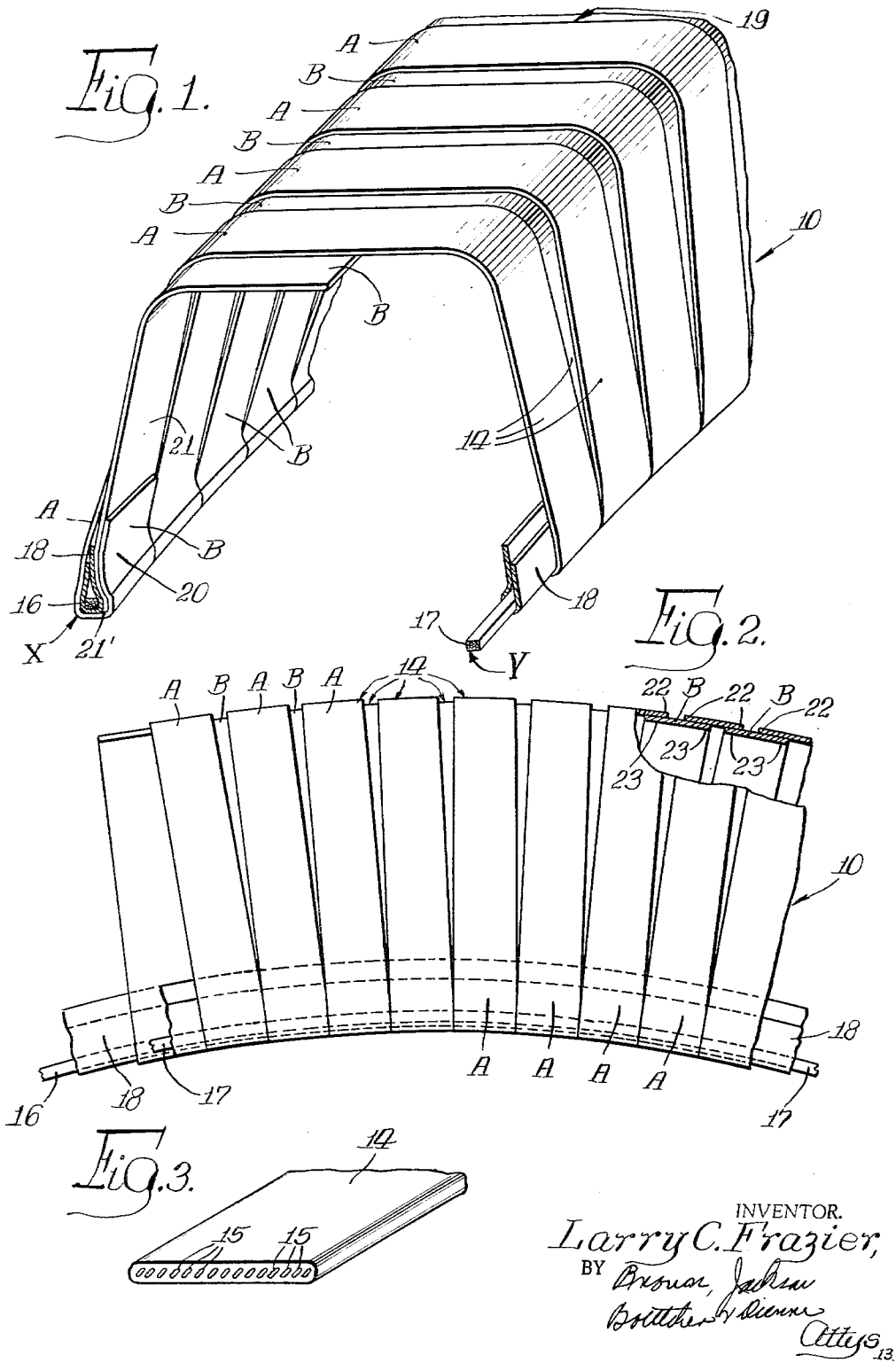

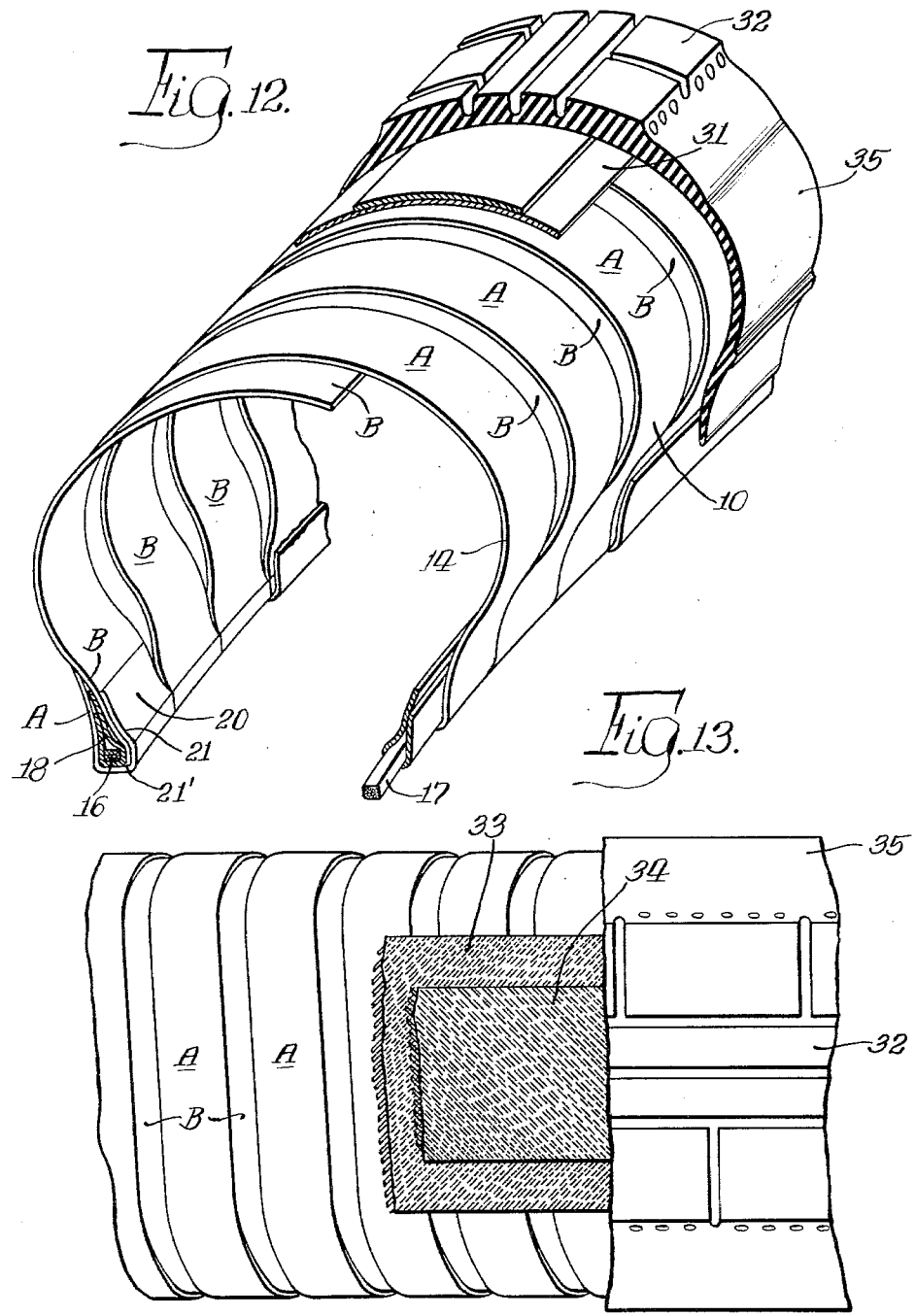

United States Patent Office 3,240,250
Patented Mar. 15, 1966

3,240,250
PNEUMATIC TIRES
Larry C. Frazier, Prescott, Ariz., assignor to National-Standard Company, Niles, Mich., a corporation of Delaware
Filed June 11, 1964, Ser. No. 374,331
6 Claims. (Cl. 152—354)

The present invention relates to pneumatic tires.

The tire art in most recent years has followed the practice of forming a bias angle tire carcass by first wrapping a plurality of sheets of suitable bias cut cord reinforced raw rubber fabric in the form of a cylinder on a cylindrical forming drum. Bead rings are then placed inwardly of the opposite ends of the cylinder of sheet material and portions of the opposite ends of the cylinder are subsequently turned up and over or turned down and around the bead rings. These turned up and turned down portions are referred to in the art as turn-ups and turn-downs, respectively, and are secured to adjacent portions of the cylinder lying axially inwardly of the bead rings by the tackiness of the raw rubber of the ply material. The breaker strips, chafers, tread and other components are then applied and the assembly is shaped into a torus and cured to produce a finished tire. Tires so constructed have many disadvantages. For example, in shaping the cylindrical assembly into toroidal configuration, the cords of the ply material are placed under a load in tension which results in movement of the ply material around the bead rings and in so doing the material in the bead area may be reduced below an amount essential to afford the necessary safe strength for the tire at the beads. Further, movement of the ply material will frequently be greater at one bead ring than the other and the resulting tire will have a so-called starved bead which seriously detrimentally affects the quality and safety of the tire.

Also, in the art today radial or zero angle tires are known which are characterized by cord reinforced ply material in which the cords in the carcass extend in a radial direction, or stated otherwise, the cords lie in planes extending radially outwardly from the axis of rotation of the tire. In fabricating a tire of this type expanding of the material from the cylindrical carcass contour to torus shape, the number of reinforcing cords or cord count at the crown of the tire beneath the tread is considerably reduced, and is substantially less than at the bead rings of the tire. Again, in the radial angle tire the carcass material is formed with turn-ups or turn-downs to encompass the bead rings, and in shaping the tire to toroidal form the ply material may move around the bead rings with the resultant disadvantage as above noted with reference to bias angle tire. In the radial angle tire an inextensible breaker or cincture structure lies between the tread and crown of the carcass and for satisfactory functioning it is desirable that the crown of the tire possess certain bending stress characteristics. As above noted, in expanding a tire carcass assembly from its flat building cylindrical form to its torus form, there is a considerable loss of cord count at the crown of the tire, so that the completed tire lacks adequate reinforcement at the crown. Further, in the known radial angle tires there are no cords of the carcass ply crossing one another in reinforcing relation in the side wall areas of the tires between the bead rings and the crown with the result that tire has low resistance to damage, such as that caused by curb bruising, scuffing and the like. Additionally, such tires are weak at their bead rings where maximum strength is important. Further, in both the bias angle and radial angle tires and, especially, if the tire building material is reinforced with metal wire, the turn-ups and turn-downs at the beads tend to move or spring away from the carcass and are difficult to retain in position until the tire can be cured. Even in a cured tire the free ends of the wires in the turn-ups or turn-downs may readily damage adjacent components of the tire.

The present invention has as its object the provision of the tires of simple and economical construction which avoid the foregoing typical disadvantages of and other unsatisfactory aspects hereinafter related of presently known tire constructions.

In order to achieve the foregoing object according to the present invention a raw tire carcass is provided comprising a pair of annular bead rings disposed in spaced apart relation on a common axis, and a generally torus shaped body approximating the form it is to have in a completed tire formed of raw rubber carcass strip material reinforced by one or more cords extending lengthwise thereof in which the strip material lies in circumferentially successive first layers extending from the center line of the inner periphery of one bead ring to the center line of the inner periphery of the other bead ring at a first slight angle to a plane passing radially outwardly of the axis of the bead rings, and in circumferentially successive second layers extending from the center line of the inner periphery of the other bead ring to the center line of the inner periphery of the one bead ring at a second slight angle to the aforementioned radial plane and opposite the first angle of the first layer. Preferably the first and second layers are alternately formed from a continuous strip of material, and the adjacent side edges of the material of successive first and second layers, respectively, substantially abut at the bead rings to provide superposed first and second layers at and encompassing the bead rings, and in which the adjacent side edges of the first and second layers diverge away from each other from the bead rings toward the crown of the carcass at which portions of the side edges of each of the successive first layers are preferably in abutting or overlapping relation with portions of opposed side edges of each successive pair of the successive second layers at the outer periphery of the crown portion of the carcass. The extent of overlap of the strip material at the crown of the carcass is a function of the ratio of bead ring diameter to the outside diameter of the wrapped raw carcass. Preferably the strip material at the crown approaches a single layer.

In the raw tire carcass aforesaid the raw rubber flat strip material may be of single or multiple ply material, and such flat strip material may be arranged in any desired number of superposed successive layers corresponding to the aforementioned first and second layers to provide the number of plies desired at the bead rings and dome of a raw tire carcass.

A raw tire carcass as above described may be assembled with inextensible breaker means or cincture structure around the crown portion thereof inwardly of the tread and together with other components such as bead chafers and side walls, and such assembly cured according to conventional practices to form a completed tire.

A tire constructed of a raw rubber carcass according to the invention has many advantages over known tire constructions of which the following are examples:

(1) By building the raw tire carcass in a torus approximating its final form in a completed tire little movement of the reinforcing cords of the strip material is effected in completing the tire so that the positioning of the cords may be accurately controlled. Further, the cord count of the carcass at the crown is substantially greater than the cord count in presently known tires.

(2) The flat strip material fully encases the bead rings and no turn-ups or turn-downs are present and the requirement in known tires of extra material for this purpose is eliminated.

(3) The expanding of the raw rubber carcass of the invention in completing a tire does not entail revolving of material around the beads thus avoiding distortion and misplacement of the components in close relation to the bead rings in the completed tire.

(4) The high cord count at the crown achieved by the use of strip material wrapped in toroidal form to approximate a single layer at the crown not only provides strength when needed, but reduces the amount of cord required to build a satisfactory tire.

(5) The provision of a tire carcass having desirable bending stresses at the crown of the carcass for embodying an inextensible breaker or cincture structure therewith.

(6) The cords of the superposed first and second layers of strip material at the side walls are in crossing relation and form reinforcing structures of superposed plies at the bead rings of generally triangular configuration with the bases of the triangular configurations lying at the bead rings and with the sides thereof extending from the beads toward the crown thus adding strength to the side walls of the tire and avoiding the requirement of the prior art of adding a flank ply for this purpose.

(7) The use of flat strip material for forming a carcass eliminates the presence of turn-ups and turn-downs and permits not only the use of conventional cord reinforcing material such as rayon and nylon, but cords of metal and particularly steel which presents major problems with presently known methods of building tires.

(8) The tire carcass of the invention may be made with a lesser number of components as compared with known tires and provides a tire of minimum weight with maximum strength where needed.

(9) The tire carcass has a high safety factor due to the wrapping of the strip material to encase the bead rings and avoids the danger of failing due to multiple cord endings of turn-ups or turn-downs of known tires.

The above and other objects and advantages of the invention will appear from the following detailed description of preferred embodiments of the invention.

Now in order to acquaint those skilled in the art with the manner of constructing tires utilizing the improved raw tire carcass of the present invention, I shall describe in connection with the accompanying drawings a preferred embodiment of the raw tire carcass of the invention.

In the drawings:

FIGURE 1 is a perspective view of a portion of a raw tire carcass according to the present invention;

FIGURE 2 is a side elevational view of the raw tire carcass of FIGURE 1;

FIGURE 3 is a perspective view of a portion of raw rubber carcass strip material embodied in the carcass of FIGURES 1 and 2;

FIGURE 4 is a schematic developed plan view of a portion of the carcass of FIGURES 1 and 2;

FIGURE 5 is a transverse cross-sectional view taken along the line 5—5 of FIGURE 4 looking in the direction indicated by the arrows;

FIGURE 6 is a transverse cross-sectional view taken along the line 6—6 of FIGURE 4 looking in the direction indicated by the arrows;

FIGURE 7 is a transverse cross-sectional view taken along the line 7—7 of FIGURE 4 looking in the direction indicated by the arrows;

FIGURE 8 is a transverse cross-sectional view taken along the line 8—8 of FIGURE 4 looking in the direction indicated by the arrows;

FIGURE 9 is a transverse cross-sectional view taken along the line 9—9 of FIGURE 4 looking in the direction indicated by the arrows;

FIGURE 10 is a transverse cross-sectional view taken along the line 10—10 of FIGURE 4 looking in the direction indicated by the arrows;

FIGURE 11 is a transverse cross-sectional view taken along the line 11—11 of FIGURE 4 looking in the direction indicated by the arrows;

FIGURE 12 is a perspective view of a portion of a completed tire embodying the carcass of FIGURES 1 and 2 with certain parts being broken away to illustrate a typical arrangement of components of a tire of this invention; and FIGURE 13 is a plan view of the portion of the tire shown in FIGURE 12.

According to the present invention, a raw rubber carcass 10, as shown in FIGURES 1 and 2, is formed from continuous raw rubber carcass strip material 14, a portion of which is shown in detail in FIGURE 3. The strip material 14 may be formed from any of the known raw rubber stock materials employed in the tire art and the strip material, as shown, is reinforced by lengthwise-extending cords 15. The cords 15 may be fabricated of any desired materials such as nylon, rayon, or metal or combinations thereof, and may comprise mono-filament or multi-filament strands twisted or stranded together and, if desired, such strands may also, in turn, be reinforced.

The carcass 10 embodies a pair of bead rings 16 and 17 which may include conventional bead covers 18 disposed in spaced apart relation axially of the rotational axis of the tire in which the carcass is to be embodied. The strip material 14 extends in circumferentially successive layers between the bead rings 16 and 17 to form a substantially torus body approximating the shape it is to have in a completed tire. The strip material 14 for the carcass preferably is uninterrupted beginning with one free end and continuing to its other end so that there are but two ends of the material in the completed torus body. The strip material 14 extends radially outwardly of and between the bead rings 16 and 17 in circumferentially successive first outer layers, indicated at A, which may be considered as extending from the center line of the inner periphery of bead ring 16, as indicated at X, to the center line of the inner periphery of bead ring 17, as indicated at Y, at a first slight angle, for example, of the order of 2°, to a plane passing radially outwardly of the axis of the bead rings, and in circumferentially successive second inner layers B in superposed relation with respect to layers A, and which layers B may be considered as extending from the center line at Y of bead ring 17 to the center line of the inner periphery at X of bead ring 16, again at a second slight angle of the order noted to the aforementioned radial plane but in the opposite direction of the angle of the first layers A. The torus body defined by the layers A and B has a crown portion generally indicated at 19 lying radially outwardly of the bead rings 16 and 17. A starting or lead end portion 20 of the strip material 14, may, as shown in FIGURE 2, be positioned a short distance radially outwardly of bead ring 16 to form an end portion of an inner layer B and wrapped around bead ring 16 and extended to bead ring 17 to form the first of the circumferentially successive outer layers A, and then from bead ring 17 to bead ring 16 in a first full inner layer B in superposed relation inwardly of such first outer layer A, and thus continuing to alternately circumferentially lay outer and inner layers A and B with the finishing or terminal end of the strip material, as indicated at 21, being layed under the starting portion 20 and with the terminal edge of portion 21 terminating at the toe of bead 16, as at 21' to complete the final inner layer B of the completed torus body. The beginning and ending position of the strip material is not critical but may be disposed in any position in completing the final layer of the torus body.

It is preferable in constructing the torus body to abut adjacent side edges of the strip material 14 of circumferentially successive outer and inner layers A and B, respectively, at the bead rings. This relationship is best seen in FIGURE 1, which shows the adjacent edges of circumferentially successive outer layers A abutting each other outwardly of and at bead rings 17, and the adjacent edges of successive inner layers B abutting each other inwardly of and at bead rings 16. Also, as will be clear from FIGURES 1 and 2, it will be seen that the adjacent opposed side edges of circumferentially successive layers A and B diverge away from each other in a direction extending from the bead rings toward the crown of the carcass. In the embodiment shown, the opposed side edges 22 of each of the successive outer layers A are in overlapping relation with portions of the opposed side edges 23 of each successive pair of inner layers B.

The diagrammatic developed plan view of FIGURE 4 and the cross-sectional views of FIGURES 5 through 11 show the relationships last described. In FIGURE 11 it will be seen that the overlapping and superposed relationship of layers A and B at the bead rings 16 and 17, in effect, provides a double ply at the bead rings. Viewing FIGURES 10 through 5, in that order, it will be noted that the opposed edges 22—22 of successive outer layers A, and the opposed side edges 23 of successive layers B diverge away from each other toward the crown of the carcass, and that the overlap of the edges 22 of the layers A with respect of the edges 23 of superposed layers B is of minimum extent at the crown of the carcass and in effect approaches a single ply thereat.

As before mentioned, the strip material forming the layers A and B is preferably reinforced by a plurality of cords 15 extending lengthwise thereof, and upon reference to FIGURE 4 it may be visualized that the cords of the first layer A at the left of the figure are in maximum crossing relation with the cords of the next succeeding layer B at the bead ring 17 and the cords are in diminishing crossing relation toward the bead ring 16. This crossing relationship of the cords thus define a substantially triangular configuration having its base at bead ring 17 with one side of the triangular relationship being in effect defined by edge 25 of layer A and edge 26 indicated in dotted lines of the superposed layer B terminating in an apex as indicated at 27 at bead ring 16. The next circumferentially successive outer layer A, as shown in FIGURE 4, extends from bead ring 16 in superposed relation with respect to the last mentioned inner layer B and define a generally triangular configuration of crossing cords of such last two layers A and B with the base of the triangle being at bead ring 16, and sides thereof defined by full line 28 of such outer layer A and the dotted line 29 of inner layer B terminating in an apex 30 at bead ring 17. Thus, the reinforcing cords of superposed inner and outer layers are in maximum crossing relationship at the beads and in minimum crossing relation at the crown. As before mentioned, the circumferentially successive outer layers A and circumferentially successive inner layers B may have their edge portions in overlapping relation as above described, or the strip material may be wound so that the several edges are in abutting relationship at the crown. The relationship or disposal of the edges of the layers A and B with respect to each other may be predetermined as a function of the ratio of the diameter of the bead rings to the outer diameter of the torus body at the crown and such ratio will also be determinative of the apex of the triangular configuration of the crossing cords of the inner and outer layers.

The width of the strip material for fabricating the carcass, as aforedescribed, should be an equal divisor of the bead circumference to properly fill out a torus body of inner and outer layers A and B, as above described. For example, strip material of .79 inch in width wrapped in sixty layers A and B would fill out a bead ring of 47.40 inches in circumference. The thickness of the strip material should be in a minimum amount to embed the reinforcing cords by conventional extruding methods.

After fabrication of raw rubber tire carcass 10, as above described, it may be incorporated in a completed tire as shown in FIGURE 12, in accordance with conventional tire building methods. As shown in FIGURE 12, a two-ply cincture structure or inextensible breaker 31 is incorporated between the crown of the carcass 10 and a tread 32. The cincture structure 31 may, for example as shown in FIGURE 13, comprise an inner layer of bias cut reinforced tire fabric 33, and a narrower outer layer 34 of bias cut material, with the cords of the latter extending in crossing relation to the cords of the inner layer 33. Other cincture or inextensible breaker strips may be employed for incorporation between the carcass 10 and the tread 32. Side walls 35 may be applied in any suitable manner and the assembly cured according to conventional practices to complete the tire.

As previously noted, the carcass 10 approximates the form of the carcass in the completed tire. Upon assembly of the carcass 10 with the cincture structure 31, tread 32 and side walls 35, the carcass need only be expanded a nominal amount as, for example, in the ratio of 1.0 to 1.061, as compared with the conventional prior art expansion ratio of the order of 1.0 to 1.44. Thus, assuming a strip material employing 28 cords per inch of width and with the aforementioned expansion fact of 1.061, the cord count at the crown of the tire would be in the amount of 26.3. At the beads 16 and 17 there would be no loss of cord count and in superposed layers A and at the beads there would be 56 cords per inch width of strip material. The tire of the present invention, by reason of constructing the raw tire carcass in a form approximating its final form in a completed tire, is characterized by uniform disposition of the reinforcing cords at the crown of the tire.

As before mentioned, the strip material 14 may be of single or multiple ply material and if desired additional layers like the above described layers A and may be employed in the carcass.

While a preferred form of carcass of the invention has been shown and described, it will be understood that various modifications and rearrangements may be made therein without departing from the spirit and scope of the invention.

I claim:

1. A raw tire carcass comprising a pair of bead rings disposed in spaced apart relation on a common axis, and a torus body having a crown portion lying radially outwardly of said bead rings comprising continuous raw rubber carcass strip material cord-reinforced in its lengthwise direction disposed in circumferentially successive first layers each extending from the center line of the inner periphery of one of said bead rings to the center line of the inner periphery of the other of said bead rings at a first slight angle to a plane passing radially outwardly of the axis of said bead rings, and in circumferentially successive second layers each extending from said center line of the inner periphery of said other bead ring to said center line of the inner periphery of said one bead ring at a second slight angle to said radial plane and opposite said angle of said first layers.

2. A raw tire carcass comprising a pair of bead rings disposed in spaced apart relation on a common axis, and a torus body having a crown portion lying radially outwardly of said bead rings comprising continuous raw rubber carcass strip material reinforced by cords extending lengthwise thereof disposed in circumferentially successive first layers each extending from the center line of the inner periphery of one of said bead rings to the center line of the inner periphery of the other of said bead rings at a first slight angle to a plane passing radially outwardly of the axis of said bead rings, and in circumferentially successive second layers each extending from said center line of said inner periphery of said other bead ring to said center line of the inner periphery of said one bead ring at a second slight angle to said radial plane and opposite said angle of said first layers, the adjacent side edges of said successive first layers being in abutting relation at said bead rings and diverging away from each other in a direction away from said bead rings toward said crown portion of said body, and the adjacent side edges of said second layers being in abutting relation at said bead rings and diverging away from each other in a direction away from said bead rings toward said crown portion of said body.

3. A raw tire carcass comprising a pair of bead rings disposed in spaced apart relation on a common axis, and a torus body having a crown portion lying radially outwardly of said bead rings comprising continuous raw rubber carcass strip material reinforced by cords extending lengthwise thereof disposed in circumferentially succesive first layers each extending from the center line of the inner periphery of one of said bead rings to the center line of the inner periphery of the other of said bead rings at a first slight angle to a plane passing radially outwardly of the axis of said bead rings, and in circumferentially successive second layers each extending from said center line of the inner periphery of said other bead ring to said center line of the inner periphery of said one bead ring at a second slight angle to said radial plane and opposite said angle of said first layers, the adjacent side edges of said successive first layers being in abutting relation at said bead rings and diverging away from each other in a direction away from said bead rings toward said crown portion of said body, the adjacent side edges of said second layers being in abutting relation at said bead rings and diverging away from each other in a direction away from said bead rings towards said crown portion of said body, and portions of said side edges of each of said successive first layers being in overlapping relation with ports of opposing side edges of each successive pair of said successive second layers.

4. In a tire, the combination of a carcass comprising a pair of bead rings disposed in spaced apart relation on a common axis, and a torus body having a crown portion lying radially outwardly of said bead rings formed of continuous rubber carcass strip material cord-reinforced in its lengthwise direction lying in circumferentially successive first layers each extending from the center line of the inner periphery of one of said bead rings to the center line of the inner periphery of the other of said bead rings at a first slight angle to a plane passing radially outwardly of the axis of said bead rings, and in circumferentially successive second layers each extending from said center line of the inner periphery of said other bead ring to said center line of the inner periphery of said one bead ring at a second slight angle to said radial plane and opposite said angle of said first layers, an outer circumferential tread, and substantially inextensible breaker means between said tread and said crown of said body.

5. In a tire, the combination of a carcass comprising a pair of bead rings disposed in spaced apart relation on a common axis, and a torus body having a crown portion lying radially outwardly of said bead rings formed of continuous rubber carcass strip material reinforced by cords extending lengthwise thereof lying in circumferentially successive first layers each extending from the center line of the inner periphery of one of said bead rings to the center line of the inner periphery of the other of said bead rings at a first slight angle to a plane passing radially outwardly of the axis of said bead rings, and in circumferentially successive second layers each extending from said center line of the inner periphery of said other bead ring to said center line of the inner periphery of said one bead ring at a second slight angle to said radial plane and opposite said angle of said first layers, the adjacent side edges of said successive first layers being in abutting relation at said bead rings and diverging away from each other in a direction away from said bead rings toward said crown portion of said body, and the adjacent side edges of said second layers being in abutting relation at said bead rings and diverging away from each other in a direction away from said bead rings toward said crown portion of said body, an outer circumferential tread, and substantially inextensible breaker means between said tread and said crown of said body.

6. In a tire, the combination of a carcass comprising a pair of bead rings disposed in spaced apart relation on a common axis, and a torus body having a crown portion lying radially outwardly of said bead rings formed of continuous rubber carcass strip material reinforced by cords extending lengthwise thereof lying in circumferentially successive first layers each extending from the center line of the inner periphery of one of said bead rings to the center line of the inner periphery of the other of said bead rings at a first slight angle to a plane passing radially outwardly of the axis of said bead rings, and in circumferentially successive second layers each extending from said center line of the inner periphery of said other bead ring to said center line of the inner periphery of said one bead ring at a second slight angle to said radial plane and opposite said angle of said first layers, the adjacent side edges of said successive first layers being in abutting relation at said bead rings and diverging away from each other in a direction away from said bead rings toward said crown portion of said body, the adjacent side edges of said second layers being in abutting relation at said bead ring and diverging away from each other in a direction away from said bead rings toward said crown portion of said body, and portions of said side edges of each of said successive first layers being in over-lapping relation with portions of opposing side edges of each successive pair of said sucessive second layers at the periphery of said crown portion of said body, an outer circumferential tread, and substantially inextensible breaker means between said tread and said crown of said body.

References Cited by the Examiner

UNITED STATES PATENTS

| 1,818,944 | 8/1931 | Darrow | 152—354 |
| 1,890,785 | 12/1932 | Johnson | 156—417 |
| 1,948,035 | 2/1934 | Johnson | 156—417 |
| 2,501,372 | 3/1950 | Benson | 152—354 |

ARTHUR L. LA POINT, *Primary Examiner.*